Oct. 30, 1923.
B. B. GOLDSMITH
INK CARTRIDGE
Original Filed May 21, 1919    2 Sheets-Sheet 1
1,472,064
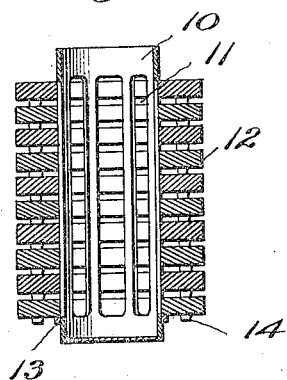
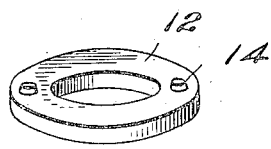
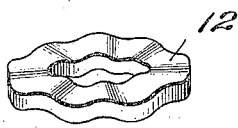
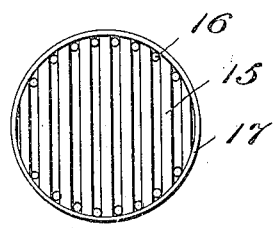
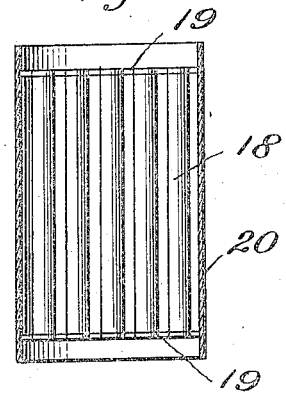
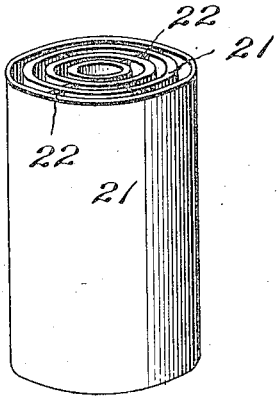
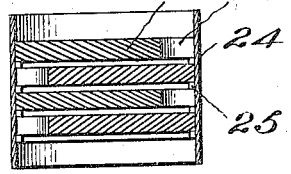
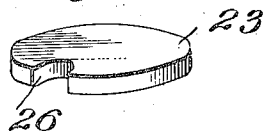
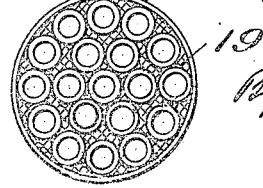
Byron B. Goldsmith
Inventor
BY H. MacKay
ATTORNEY Oct. 30, 1923.
B. B. GOLDSMITH
1,472,064
INK CARTRIDGE
Original Filed May 21, 1919    2 Sheets-Sheet 2
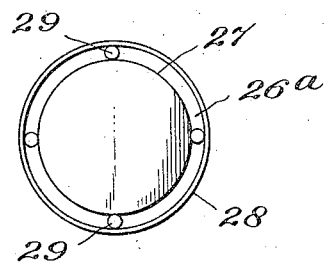
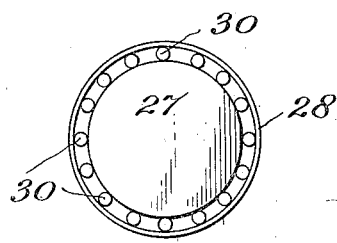
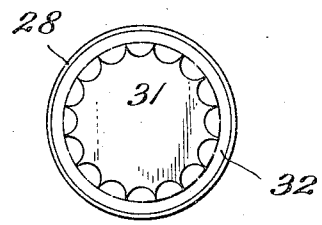
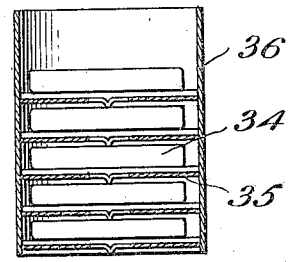
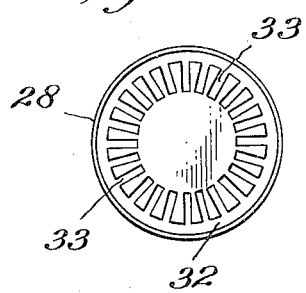
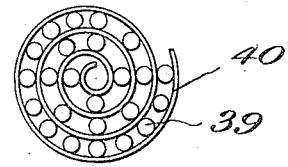
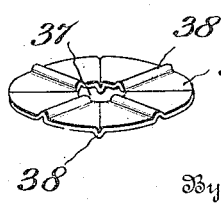

Patented Oct. 30, 1923.

1,472,064

UNITED STATES PATENT OFFICE.

BYRON B. GOLDSMITH, OF NEW YORK, N. Y.

INK CARTRIDGE.

Application filed May 21, 1919, Serial No. 298,637. Renewed July 24, 1922. Serial No. 580,330.

*To all whom it may concern:*

Be it known that I, BYRON B. GOLDSMITH, a citizen of the United States, residing at New York, in the county of New York and State of New York, have invented certain new and useful Improvements in Ink Cartridges; and I do hereby declare the following to be a full, clear, and exact description of the invention, such as will enable others skilled in the art to which it appertains to make and use the same.

The present invention relates to a new and improved means for producing ink conveniently, rapidly and efficiently. Many different devices have been tried for producing ink by the simple addition of water to the ink-producing materials. These have either been contained in special receptacles, or have been in the form of tablets to be dissolved in water. Of these methods the only one which has survived is the ink tablet, as the former did not produce a suitable ink. The disadvantage of using the ink tablet is readily understood when one considers that to make ink from ink tablets it is necessary to take a measured amount of water for each tablet and place both in a suitable receptacle and agitate until there has been complete solution. In other words, it almost amounts to as much trouble in a small way as the manufacture of liquid ink does on a large scale. The consumer becomes the ink manufacturer. For this reason ink tablets are used very little. The desire to find substitutes for the liquid ink of commerce, arises from three disadvantages it has: Firstly, it is bulky and takes up much space in the factory, on the railroads, and in the dealer's stock. Secondly, it is shipped in glass and there is considerable expense in packing safely, notwithstanding which breakages cannot be avoided. Thirdly, it cannot be shipped in winter as it freezes, ruining the ink or the bottles or both. By the use of my invention it is possible for any unskilled person to produce ink of the finest quality almost instantaneously.

The basic principle of this invention resides in supplying narrow passages for the water wholly or partly lined with ink producing material, which passages are artificially constructed with such a definite relative proportion between their diameter and length that, as the water passes through them, it necessarily has time to take up the required amount of material to produce a satisfactory ink. The use of a single channel would be within this principle of construction, in which case if the channel is wide enough to have the liquid flow rapidly it would have to be long enough to allow the liquid to dissolve sufficient material, or if the channel is narrow the liquid would flow more slowly and the channel need not be so long. It is a little simpler, however, to employ a number of passages.

The general principle underlying this invention is capable of being carried out in a variety of ways, some of which are set forth in certain copending applications for Letters Patent. There is claimed herein that general form or embodiment wherein the means for converting water into ink consists of a group of bodies separated by one or more narrow percolating passages of definite diameter, some or all of which bodies are provided on their surfaces with ink-producing material. The entire group may be composed of bodies covered with the ink-producing material, which may be a mere facing of such material on a backing or base, or may compose the entire mass of such bodies. Or, on the other hand, such bodies may be grouped with others having neutral surfaces. In any case, the parts are so assembled as to form percolating passages having the characteristics already set forth herein.

A few of the many possible specific embodiments of the invention are illustrated in the accompanying drawings, wherein Figure 1 is a vertical sectional view of a modification affording a central dipping space, Figures 2 and 3 are perspective views of two forms of discs capable of use in said modification, Figure 4 is a plan view of another modification, Figure 5 is a vertical sectional view of another form, Figure 6 is a perspective view of another modification, Figure 7 is a partial vertical sectional view of a further modification, Figure 8 is a perspective view of one of the discs employed in the last named form, Figure 9 is a plan view of the form shown in Figure 5, Figures 10 to 14 are plan views of other forms, Figure 15 is a vertical section of a further modification, and Figure 16 is a perspective view of the form of disc shown in Figure 15.

It is to be understood that the passages or channels employed in the devices actually manufactured will not be exactly as shown in the drawings. As already stated, the actual diameters and lengths of the passages will be experimentally determined for each particular type of device and character of ink.

In Figures 1 and 2 are shown a hollow cylindrical support 10 having openings 11, upon which are supported discs 12 made wholly or partly of ink-producing material, and resting on the flange 13. These are preferably spaced apart, as by the projections 14 on said discs, to form percolating passages between the discs. As shown in Figure 3, the discs may be made corrugated or of wavy irregular form, thereby forming the percolating passages between them. This modification is especially adapted for use by immersion in a body of water which will find its way into the center of the cylinder 10 which will serve as a dipping space for the pen. The invention is not limited to this mode of use, however.

In the form shown in Figure 4, the ink-producing bodies 15 take the form of plates, spaced apart, as by means of wires or rods 16, and held together by the casing 17, preferably of cylindrical form. While it is preferred to use ink-producing material upon the surfaces of all of the plates 15, this is not essential to the invention.

In the form shown in Figures 5 and 9 the bodies between which the percolating spaces are formed take the form of rods 18 supported by grids 19 placed transversely in a tubular casing 20. As shown by the double circles in Figure 9 these rods may have a neutral core with a facing of ink-producing material. Water may be poured into one end of this device, and the ink will emerge from the other end.

Another form which can be used in the same way is shown in Figure 6. Here there are employed a group of concentric tubes 21, some or all of which are faced with ink-producing material. They are spaced apart in any convenient manner to produce percolating passages, as for instance, by rods or wires 22.

In the form shown in Figures 7 and 8 the percolating spaces exist between successive discs 23, supported within a tube 24 and spaced apart by rings 25 within the tube. The discs are provided with perforations 26 located on opposite sides of the tube, so that when water is poured into the tube at one end it will be caused to flow in a narrow flat stream between all the pairs of discs successively.

In Figure 10 is shown a form wherein the percolating passage 26ª is annular in cross section, being formed between a central cylindrical core 27 and an outer cylindrical casing 28, held in concentric relation with the core by any appropriate means, as, for instance, the longitudinal rods 29. Either the outer or the inner wall of the passage 26ª or both walls may carry the ink-producing material. If desired, the spacing rods may carry this material, in which case a greater number will be used and they will be placed closer together, as shown at 30 in Figure 11. The central core is not necessarily cylindrical. For instance, a core 31 having longitudinal fluting may be used, as shown in Figure 12. In this case spacing rings 32 will be used at the two ends of the device. As shown in Figure 13, still another varient of this type is produced by grooving the core longitudinally, producing longitudinal grooves 33.

Figures 15 and 16 show another mode of assembling the parts. Here the ink-producing bodies 34, in tablet form, are supported between discs 35 fitting within a casing 36. These supporting discs are perforated as shown at 37 and have ridges 38 or other projections against which the tablets 34 rest, so as to form percolating passages above, below and around said tablets, which communicate through the openings 37.

In the form shown in Figure 14, the percolating passages are formed between the parallel rods 39, formed of or covered with ink-producing material, and held together by means of a flexible spiral envelope 40, secured in any desired manner around them.

It is to be understood that the various forms of cartridge herein shown are capable of use in different ways. For instance, they may be made very cheaply; with a thin coating of ink-producing material on the various bodies; which may be thrown away after being used once or twice. Or again, the water may be supplied more or less rapidly according as the passages are narrower or wider; or it may be made to pass through the passages more than once.

It is clear from the few examples above set forth that the present invention is capable of many modifications, and that its scope is not to be limited to the details herein shown and described.

What is claimed is—

1. An ink cartridge consisting of a group of bodies separated by one or more percolating passages of definite predetermined size, the walls of said passages being provided with ink-producing material.

2. An ink cartridge consisting of a group of bodies held in position by suitable supporting means and separated by one or more percolating passages of definite predetermined size, the walls of said passages being provided with ink-producing material.

3. The means set forth generally in claim 1 hereof, wherein plates are provided and are held apart by suitable separating devices to provide the percolating passages.

4. The means set forth generally in claim 3 hereof, wherein the plates are transverse discs carried by a suitable support.

5. The means set forth generally in claim 4 hereof, wherein the discs are perforated and are carried in an external container.

In testimony whereof, I affix my signature.

BYRON B. GOLDSMITH.